Aug. 20, 1935.    A. B. CHAMBERS    2,012,220
METHOD OF STORING AND DISPENSING LUMBER
Original Filed Sept. 6, 1932    8 Sheets-Sheet 1

Inventor:
ARTHUR B. CHAMBERS,
By C. C. Hines,
Attorney.

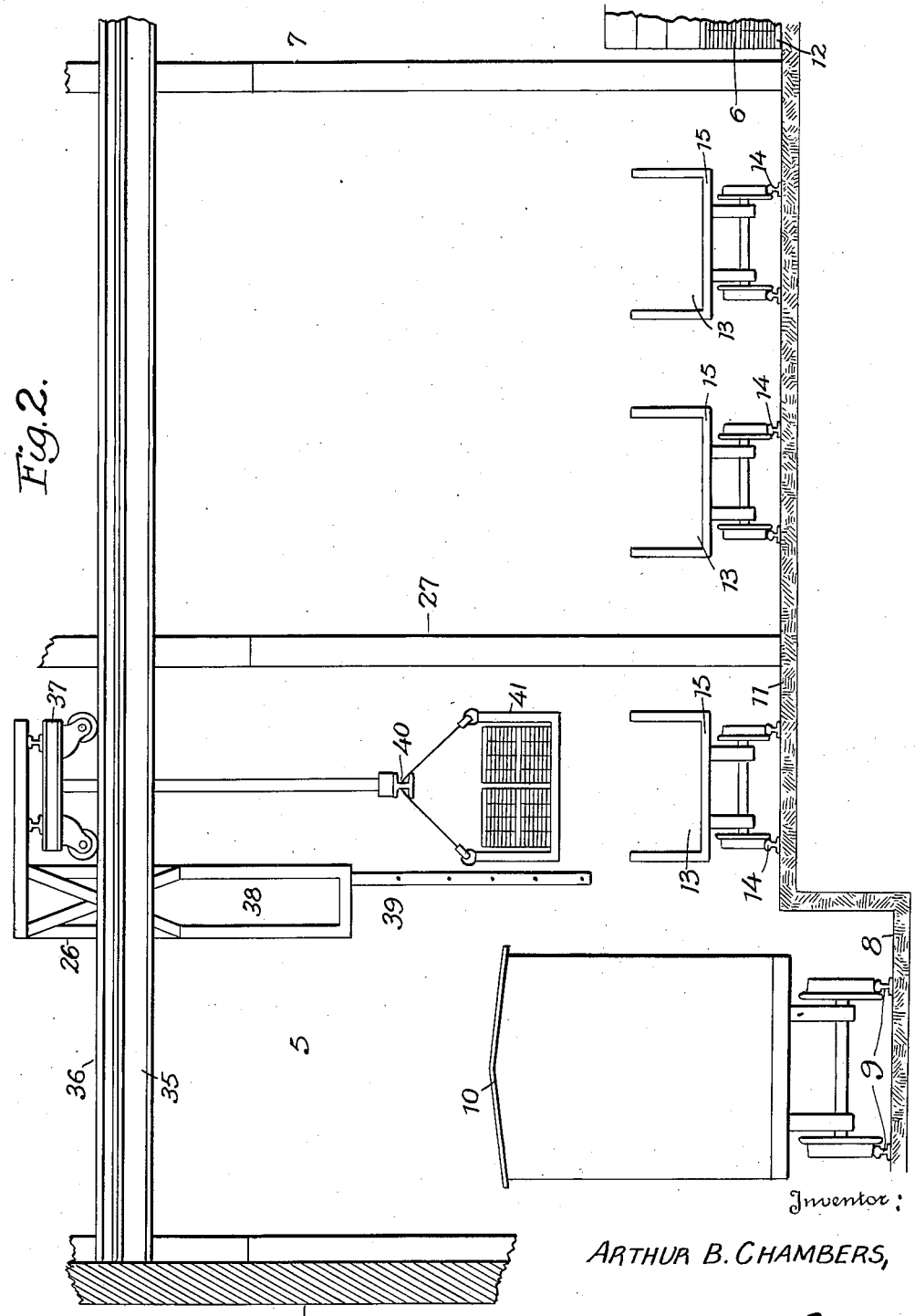

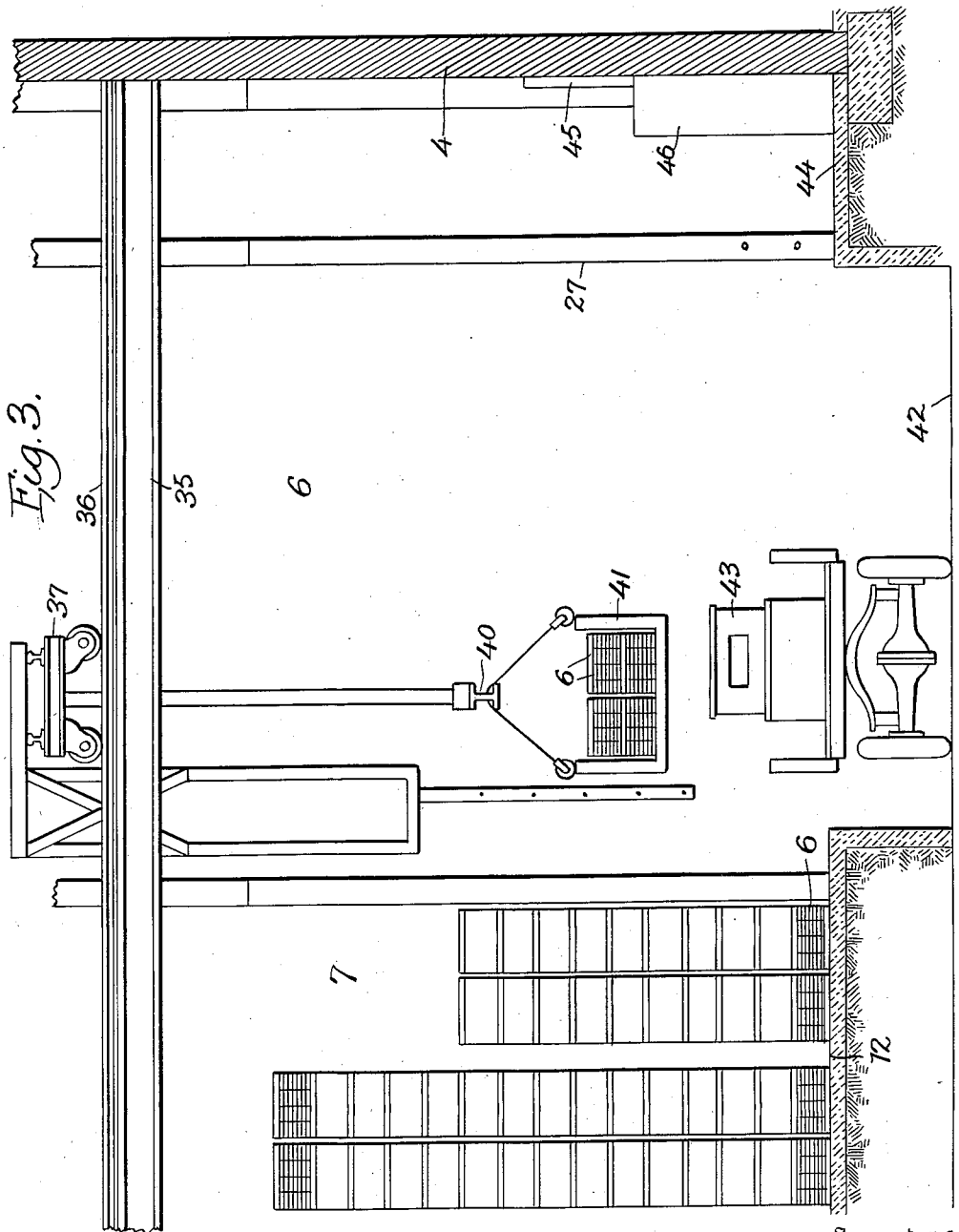

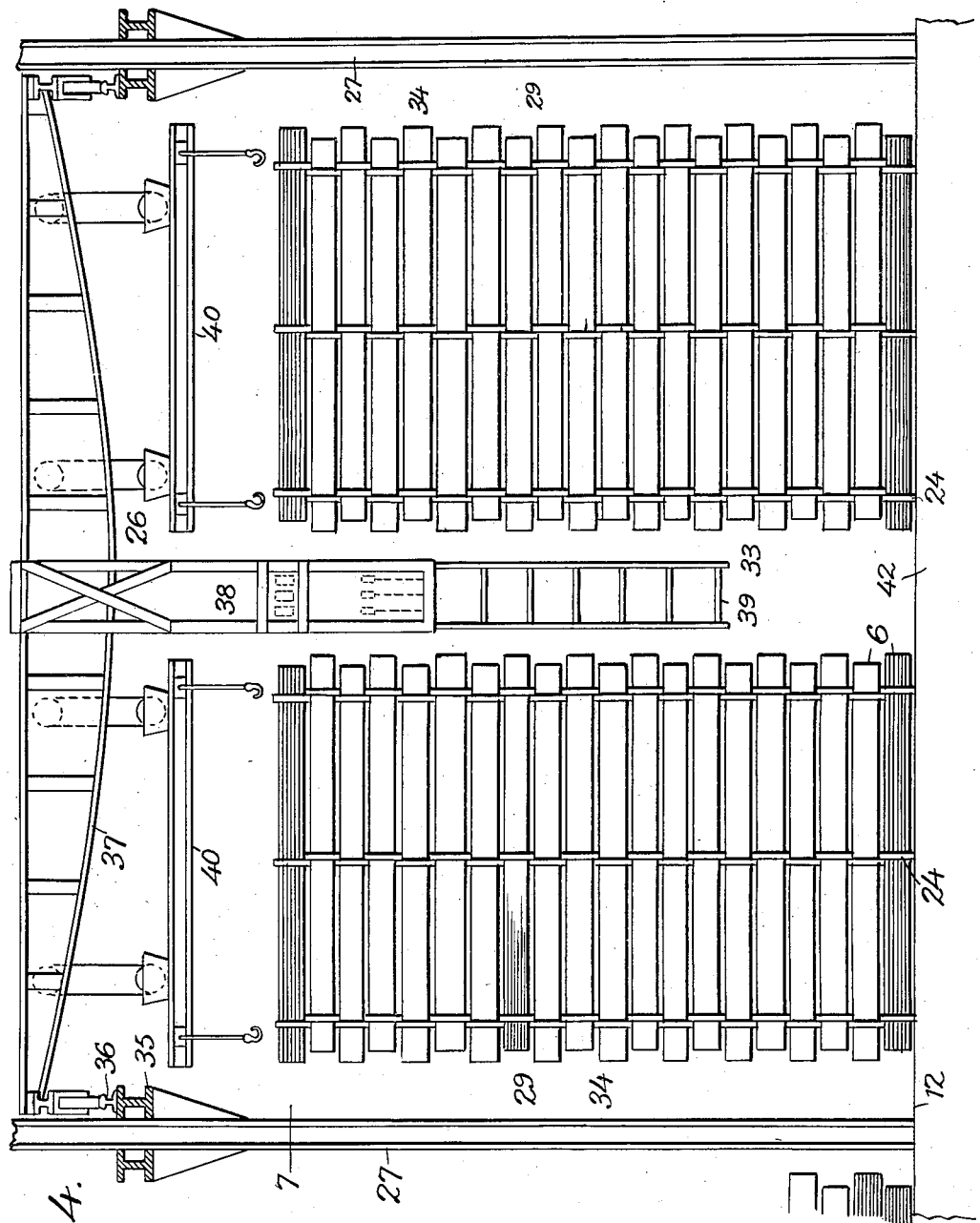

Aug. 20, 1935. A. B. CHAMBERS 2,012,220
METHOD OF STORING AND DISPENSING LUMBER
Original Filed Sept. 6, 1932 8 Sheets-Sheet 5
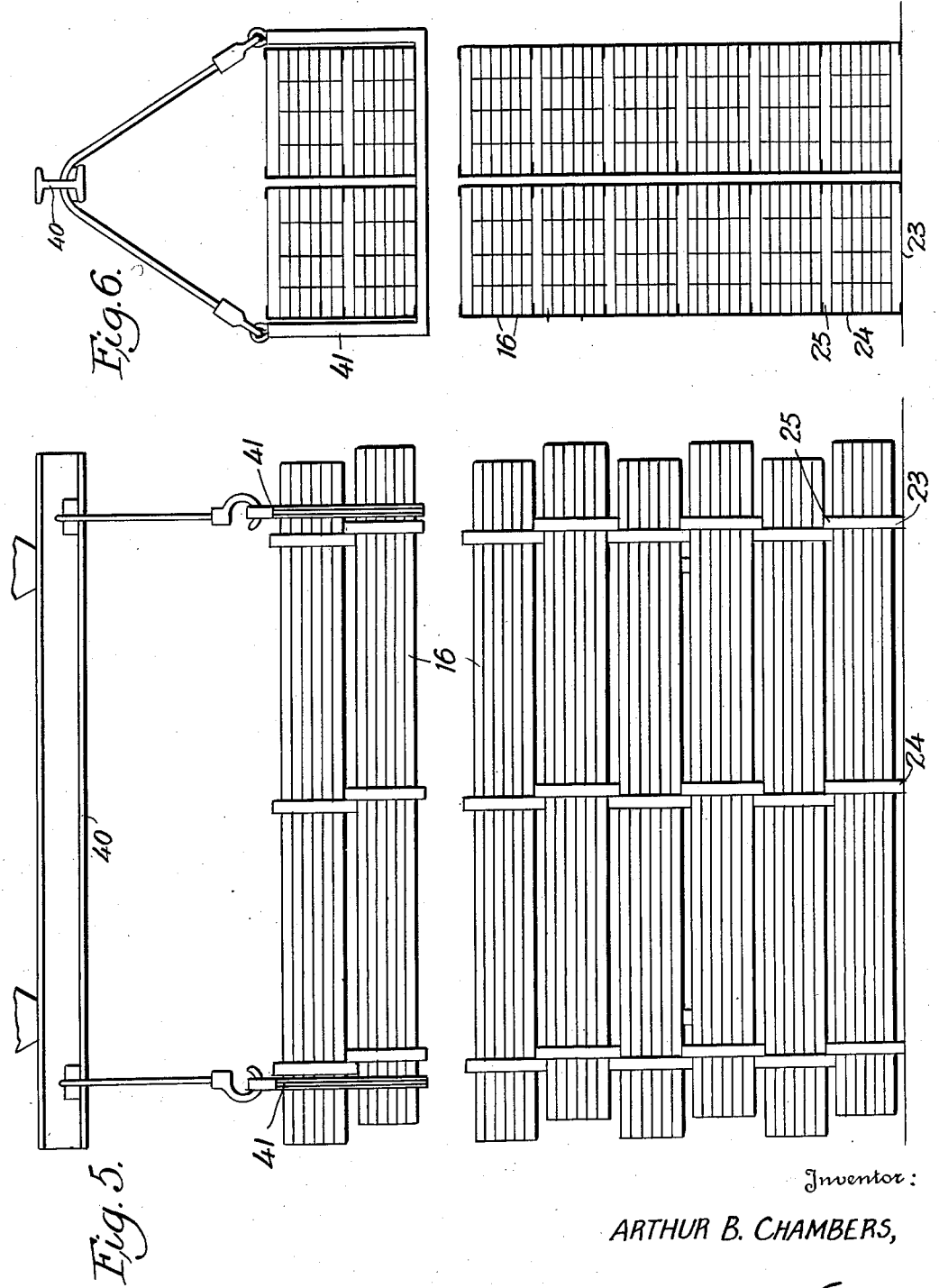
Inventor:
ARTHUR B. CHAMBERS, Aug. 20, 1935. A. B. CHAMBERS 2,012,220
METHOD OF STORING AND DISPENSING LUMBER
Original Filed Sept. 6, 1932 8 Sheets-Sheet 6
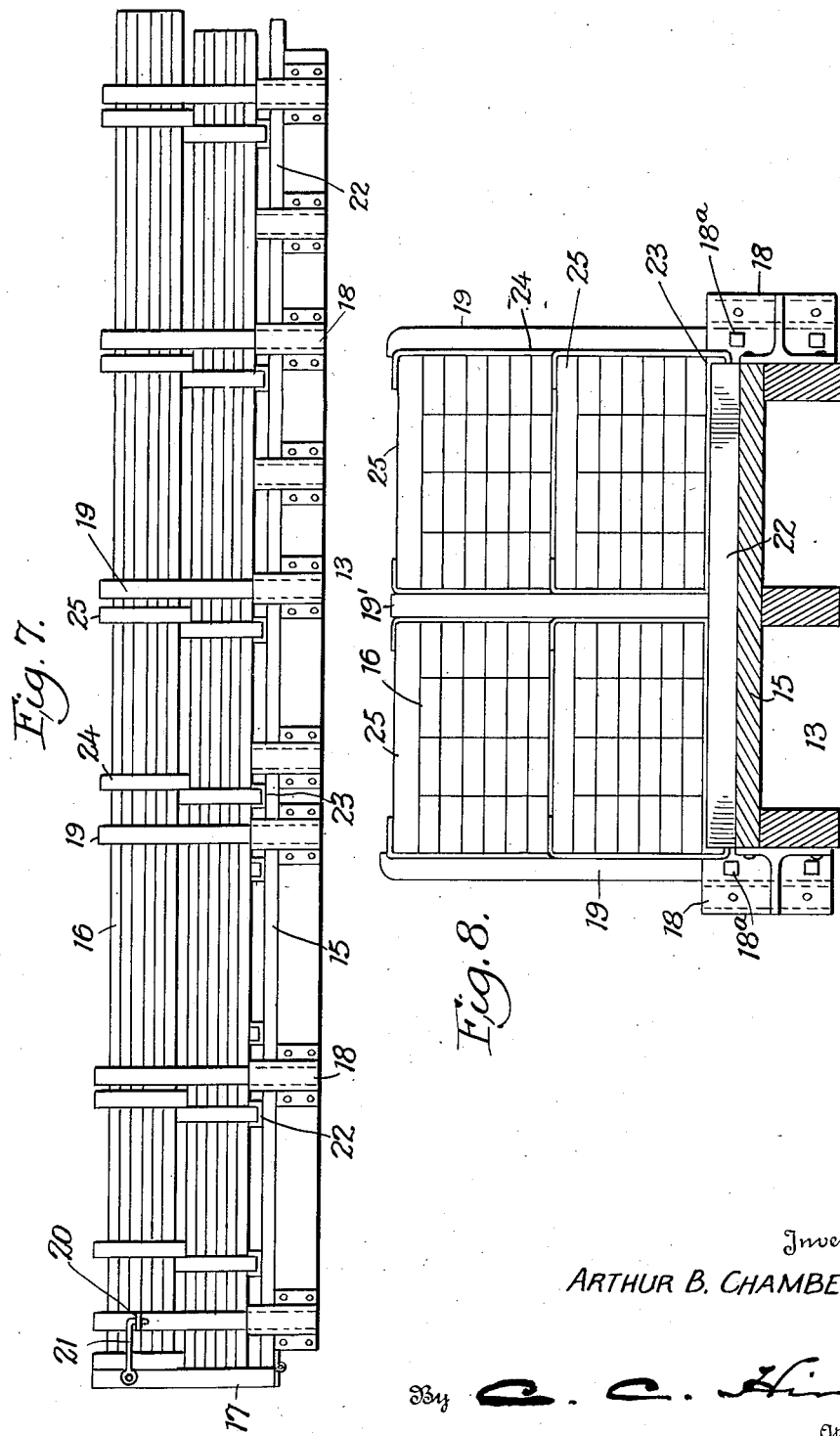
Inventor:
ARTHUR B. CHAMBERS.
By C. C. Hines,
Attorney.

Aug. 20, 1935.  A. B. CHAMBERS  2,012,220
METHOD OF STORING AND DISPENSING LUMBER
Original Filed Sept. 6, 1932  8 Sheets-Sheet 7

Inventor:
ARTHUR B. CHAMBERS,
By C. C. Hines,
Attorney.

Aug. 20, 1935.      A. B. CHAMBERS         2,012,220
METHOD OF STORING AND DISPENSING LUMBER
Original Filed Sept. 6, 1932    8 Sheets-Sheet 8

Fig. 12.

PRICE LIST.

2 x 4 #2

| BUNDLES | PIECES | | LENGTH | FEET | PRICE PER M | PRICE PER BUNDLE |
|---|---|---|---|---|---|---|
| 1 | 36 | 2x4 #2 545 SL | 8 | 192 | 15 00 | $2.88 |
| 1 | 36 | 2x4 #2 545 SL | 9 | 216 | 15 00 | 3.24 |
| 1 | 36 | 2x4 #2 545 SL | 10 | 240 | 15 00 | 3.60 |
| 1 | 36 | 2x4 #2 545 SL | 12 | 288 | 15 00 | 4.32 |
| 1 | 36 | 2x4 #2 545 SL | 14 | 336 | 16 00 | 5.55 |
| 1 | 36 | 2x4 #2 545 SL | 16 | 384 | 17 50 | 6.72 |
| 1 | 36 | 2x4 #2 545 SL | 18 | 432 | 20 00 | 8.64 |
| 1 | 36 | 2x4 #2 545 SL | 20 | 480 | 20 00 | 9.20 |
| 1 | 24 | 2x6 #2 545 SL | 8 | 192 | 15 00 | $2.88 |
| 1 | 24 | 2x6 #2 545 SL | 9 | 216 | 15 00 | 3.24 |
| 1 | 24 | 2x6 #2 545 SL | 10 | 240 | 15 00 | 3.60 |
| 1 | 24 | 2x6 #2 545 SL | 12 | 288 | 16 00 | 4.61 |
| 1 | 24 | 2x6 #2 545 SL | 14 | 336 | 16 50 | 5.55 |
| 1 | 24 | 2x6 #2 545 SL | 16 | 384 | 17 50 | 6.72 |
| 1 | 24 | 2x6 #2 545 SL | 18 | 432 | 20 00 | 8.64 |
| 1 | 24 | 2x6 #2 545 SL | 20 | 480 | 20 00 | 9.20 |
| 1 | 24 | 2x6 #2 545 SL | 22 | 524 | 25 00 | 13.10 |
| 1 | 24 | 2x6 #2 545 SL | 24 | 576 | 25 00 | 14.40 |

EACH BUNDLE OF SIMILAR SIZES TO CONTAIN SAME NUMBER OF PIECES OF LUMBER IRRESPECTIVE OF LENGTHS.

Fig. 11.

STOCK SHEET 16 FOOT ALLEY

| | | | | |
|---|---|---|---|---|
| 1x3 #3 | R1 | | 2x4 B+B | R27 |
| 1x4 #3 | R2 | | 2x6 B+B | R28 |
| 1x6 #3 | R3 | | 2x8 B+B | R29 |
| 1x8 #3 | R4 | | 2x10 B+B | R30 |
| 1x8 #3 | R5 | | 2x12 B+B | R31 |
| 1x10 #3 | L6 | | 4x4 #1 SL | L27 |
| 1x12 #3 | R6 | | 4x6 #1 SL | L28 |
| 1x12 #3 SHIPLAP | R7 | | 4x8 #1 SL | L29 |
| 1x3 #2 | L1 | | 6x6 #1 SL | L30 |
| 1x4 #2 | L2 | | 6x8 #1 SL | L31 |
| 1x6 #2 | L3 | | 8x8 #1 SL | L32 |
| 10x10 #1 SL | L8 | | 10x10 #1 SL | L33 |
| 1x8 #2 | R8 | | 12x12 #1 SL | L34 |
| 1x10 #2 | L6 | | 4x4 #1 LL | R32 |
| 1x10 #2 | L9 | | 4x6 #1 LL | R33 |
| 1x12 #2 | R9 | | 4x8 #1 LL | R34 |
| 1x12 #2 | L10 | | 6x6 #1 LL | R35 |
| 1x8 #2 SHIPLAP | R10 | | 6x8 #1 LL | R36 |
| 1x8 #2 SHIPLAP | R11 | | 6x12 #1 LL | R37 |
| 1x3 #1+C | L12 | | 8x8 #1 LL | R38 |
| 1x4 #1+C | R12 | | 8x10 #1 LL | R39 |
| 1x5 #1+C | R13 | | 8x12 #1 LL | L35 |
| 1x6 #1+C | R14 | | 10x10 #1 LL | L36 |
| 1x8 #1+C | L11 | | 10x12 #1 LL | L37 |
| 1x10 #1+C | L12 | | 12x12 #1 LL | L38 |
| 1x12 #1+C | L13 | | 3" #2 FLOORING | L39 |
| 2x4 #2 | L14 | | 4" #2 FLOORING | L40 |
| 2x4 #2 | L15 | | 6" #2 FLOORING | L41 |
| 2x4 #2 | R15 | | 4" #1 FLOORING | R41 |
| 2x6 #2 | R16 | | 6" #1 FLOORING | R42 |
| 2x6 #2 | R17 | | 3" B+B FLOORING | R43 |
| 2x6 #2 | L17 | | 4" B+B FLOORING | R44 |
| 2x6 #2 | R18 | | 3" EG B+B FLOORING | R45 |
| 2x8 #2 | L18 | | 4" HJ BB FLOORING | R46 |
| 2x8 #2 | L19 | | 4" HJ BB FLOORING | R47 |
| 5/8x4 BB CEILING | L42 | | | |
| 2x10 #2 | R20 | | 5/8x4 #1 CEILING | L43 |
| 2x10 #2 | L20 | | 3/4x4 #1 BULKHDG | L44 |
| 2x12 #2 | R21 | | 3/4x4 BB BULKHDS | L46 |
| 2x12 #2 | R22 | | 1/2x6 #2 BEVSIDING | L47 |
| 2x4 #1 LL | L22 | | 6" #2 5/8 DE #116 | L48 |

Inventor:
ARTHUR B. CHAMBERS,
By C. C. Hines,
Attorney.

Patented Aug. 20, 1935

2,012,220

UNITED STATES PATENT OFFICE 2,012,220

METHOD OF STORING AND DISPENSING LUMBER

Arthur B. Chambers, Memphis, Tenn.

Original application September 6, 1932, Serial No. 631,940. Divided and this application February 21, 1933, Serial No. 657,885

4 Claims. (Cl. 214—152)

This invention relates to a new and improved method of storing and dispensing (merchandising) lumber, and the present application is a division of my prior application Serial No. 631,940, filed September 6, 1932.

The present methods of storing, handling and merchandising lumber, particularly in retail and semi-wholesale transactions of lumber in single pieces or small bundles handled like single pieces, is wasteful, costly, and unsatisfactory both to dealer and customer. It involves the piece-handling of the lumber many times and its cutting or trimming in such ways as to cause losses in time and material, so as to unavoidably make the expense of storing and handling necessarily high. Much lumber, because of unsuitable storage facilities, must be improperly stored in the open and exposed to the weather, making it impossible for the dealer to keep his lumber clean, dry and straight, i. e., free from warping, crooking or twisting.

Heretofore lumber has always been sold on a sales basis at so much per thousand feet. An objection to this method is that only a small percentage of people know how to figure lumber and it has been possible for an unfair dealer to take advantage of a customer by delivering less than the quantity ordered and paid for. This method also in many cases involves considerable waste on account of the manner in which the lumber must be cut by the dealer to fill a certain order in addition to waste later caused in the cutting of the lumber for use.

One object of my invention is to provide a method of bundling, storing, handling and dispensing lumber in bundles larger than can be conveniently handled by hand whereby these objections are avoided, and whereby damage to lumber and other losses due to the usual methods of storing, handling and dispensing lumber may be avoided, and better lumber furnished at lower cost.

A further object of the invention is to provide a method whereby bundled lumber in large quantity and desired varieties, i. e., in larger quantity than can be conveniently handled, but bundled in suitable sizes and quantities for ready storage and sale, may be economically stored and kept dry and clean and free from warping or other atmospheric damage, and in such manner as to enable it to be put up for ready sale and dispensed with a minimum of handling and without waste, so that lumber in uniformly good condition may be supplied at a saving and with greater satisfaction to the lumber dealer and his customers.

A still further object of the invention is to provide a method of bundling lumber having for its fundamental principle the dispensing of lumber in bundles each of a given lumber length or aggregate number of feet as a basic unit of sales, whereby in making sales a customer will pay a certain price for a bundle of lumber consisting of a given number of pieces, so that in purchasing lumber from a dealer it is only necessary for the customer to know how many pieces of a certain kind or variety of lumber of a given size he needs and which can be purchased in bundled form for a stated price, which bundles are formed and stored in a novel manner so as to save time and labor in these steps and to facilitate sales operations.

In the accompanying drawings, showing, for purposes of exemplification, certain means for carrying my invention into practical effect,—

Fig. 2 is a vertical transverse section through the left-hand receiving end or station of the warehouse.

Fig. 3 is a similar view through the right-hand delivery end or station of the building.

Fig. 4 is a vertical transverse section through a portion of the main body or storage room of the warehouse, showing one of the storage aisles for two adjacent rows of bundle stacks arranged therein and also showing a crane in cooperative relation to the stacks.

Fig. 5 is a side view showing the arrangement of bundles in a stack and the mode of operation of the crane cradle in applying bundles to or removing the same from the stack.

Fig. 6 is an end view of the same.

Figs. 7 and 8 are, respectively, a side elevation and a transverse section through one of the transfer trucks.

Fig. 9 is a view of the shipping rack.

Fig. 10 is a similar view of the sign rack or holder.

Fig. 11 is a view of a stock sheet or directory.

Fig. 12 is a similar view of a price sheet.

Figure 1:
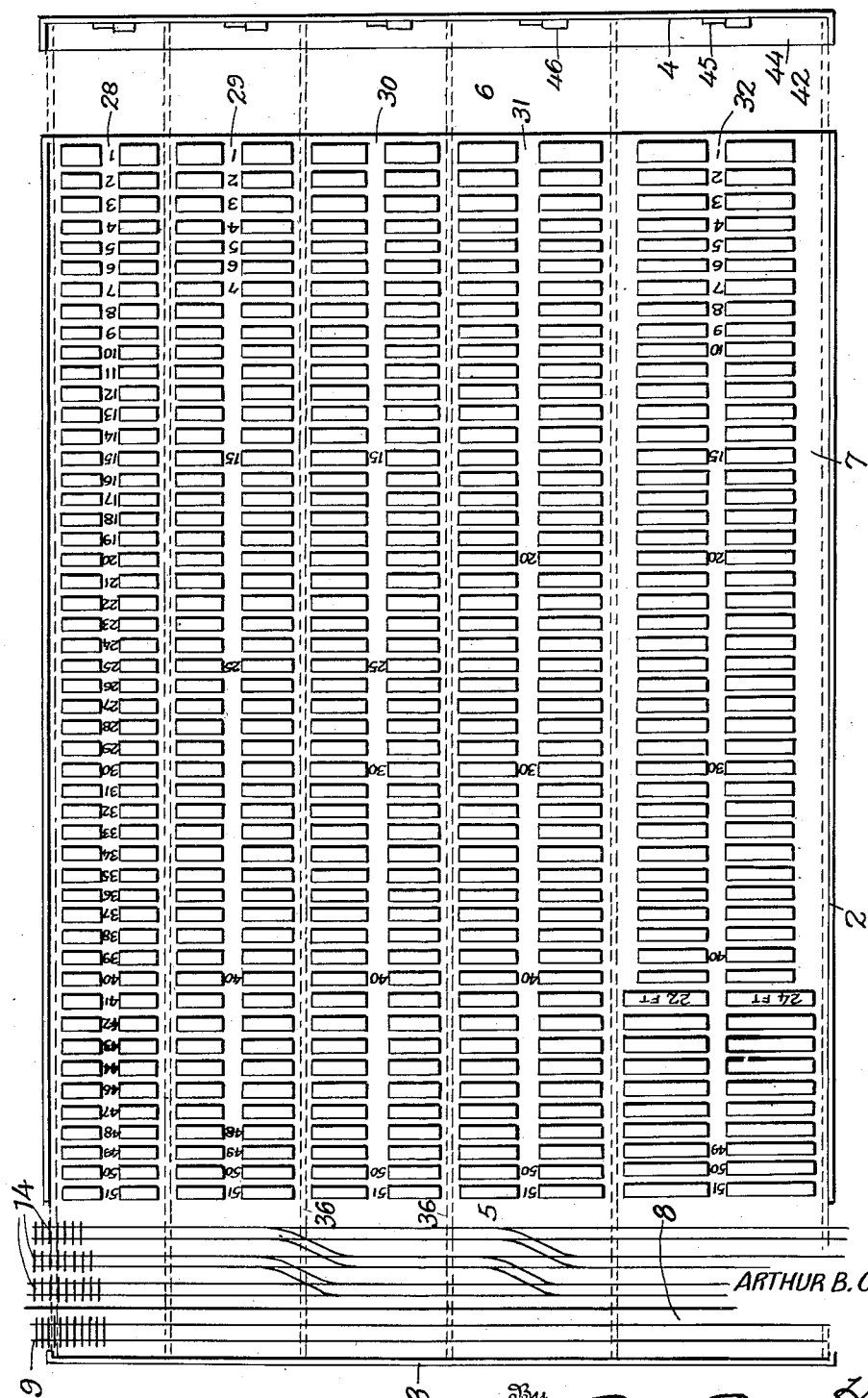
Fig. 1 is a sectional plan view, showing generally the outline of a storage warehouse equipped with handling means and having lumber stacked therein in accordance with my invention.

In carrying my invention into practice I provide a storage or warehouse structure 1 which may be of any suitable form and construction, but which as shown in the present instance is of oblong rectangular form and having side walls 2 and end walls 3 and 4 of any suitable material or materials, and which structure is provided in practice with any preferred type of roof (not shown). The interior of the building is suitably formed and constructed to provide at the end 3 a receiving station or room 5, at the end 4 a delivery station or room 6, and between the same a storage room or space 7 extending the full length of the building between the rooms or stations 5 and 6.

The outer portion of the room 5 is provided with a floor 8 on which are mounted track rails 9 of a trackway extending through doorways or openings at the opposite sides of the room 5 and suitably connecting with the main tracks or siding of a railway, whereby transport cars 10 in which lumber is shipped to the warehouse from a mill or other source of supply may be brought into the room 5 in convenient position for unloading. At the inner portion of the room 5 an elevated floor or platform 11 is arranged so as to conveniently receive the lumber unloaded from the car 10, which floor 11 is preferably disposed at the same level as and continuous with the floor 12 of the storage room 7.

The platform 11 is employed not only as an unloading platform, but as a bundling patform on which the individual pieces of lumber, cut at the mill into suitable lengths for bundling, are assembled upon a form into bundle shape and united by suitable binders into such shape to form the standard unit package. A suitable number of bundling forms are provided for the purpose, and each is of portable type and preferably comprises a wheeled hand truck 13 which may be mounted upon tracks 14, or may operate directly on the warehouse floor independent of tracks. It tracks are used, there should be a plurality of connecting parallel tracks so that any suitable or convenient number of hand trucks 13 may be employed.

Each truck 13 is provided with a stacking bed or platform portion 15 on which the cut sticks or pieces 16 of lumber to be formed into bundles are laid, and preferably, as shown in Figs. 7 and 8, four sets of sticks or pieces, of the same material, are assembled upon the bundling form or truck for the formation of four bundles in each operation, i. e., two superposed bundles on each side of the longitudinal center of the forming bed. The truck is provided at one end with a hinged drop gate or tail gate 17 and is provided at the sides thereof with suitably arranged holders 18 for the reception of stakes or standards 19, the end stakes at each side of the truck, or those nearest to the gate 17, being provided with keepers 20 to receive latch chains or hooks 21 on the gate whereby the gate may be secured in upraised position. The gate 17 when in upraised position serves as a gage or abutment, and is formed or provided for this purpose with superposed abutment surfaces 17a, 17b arranged at determined levels and in different vertical planes, as shown, against which one end of the pieces 16 of the respective bundles of each pair of bundles being formed are brought to bear, so as to keep them in correct alinement, while the stakes 19 serve as side supports to hold the pieces 16 from lateral displacement during the formation of the bundles. Preferably the holders 18 are provided with clamping screws 18a or other means for adjustably securing the stakes therein and each holder is preferably of duplex or multiple type or provided with a plurality of pockets to allow different spacing of the stakes at the sides of the truck to suit different widths of bundles which are to be formed from different sizes of lumber, and any suitable number of holders may be arranged longitudinally of the truck to permit of the proper placing of the stakes for bundles of different lengths to be formed. Preferably supports 22, comprising channel irons extending transversely of the platform 15 at suitable intervals, are provided to hold the lower pieces of the bundles spaced from the platform and to serve as gages to receive and position at predetermined distances apart the lower cleats or members of binders employed to hold the pieces of the bundles assembled, and to prevent displacement of the binders from the specified positions during the assembling operation. Each binder comprises a lower wooden cleat or strip 23 to which are attached the lower ends of metal straps 24, and an upper wooden cleat or strip 25 to which the upper ends of the straps are to be secured. The binders, of which two or more may be employed to each bundle for securing the pieces thereof together, according to the length of the bundle, are arranged a fixed distance apart as set forth to serve as vertical and horizontal (longitudinal) spacing members of the bundles to permit of the crane cradle or rack being placed for the ready lifting or placing of bundles and to limit the vertical spacing of the bundles so as to avoid objectionable spacing which would occur if the binders of superposed bundles were allowed to rest upon one another. The bundle former as thus constructed is adapted for the formation of two sets or piles of superposed bundles, one set or pile on each side of the longitudinal center of the former, in such manner as to reduce both time and labor in these operations and also in such manner as to automatically gage the placing of the pieces to secure their correct placing without material care or thought on the part of the operator, as well as to secure an automatic gaging of the bundles of the pile so that such bundles may be lifted by a crane and stacked with other bundles in a novel manner to facilitate their engagement with and disengagement from the crane and their transport thereby. In forming the first or bottom bundle of a pile, the proper number of lower cleats 23, with the straps 24 attached thereto, are placed in their holders 22 and the pieces of lumber 16 as removed from the transport vehicle 10 are laid thereon and in superposed relation and with one end of each in contact with gaging abutment 17a until a sufficient number are assembled to form a bottom bundle, after which a corresponding number of top cleats 25 are laid across the top pieces 16 of the bundle and the straps 24 then drawn tight about the assembled pieces and their upper or free ends secured to the cleats 25 to complete the formation of the bundle. Two bundles may thus be formed at the same time on the bed of the truck, one on each side of the longitudinal center thereof. Then two other or upper bundles may be formed on top of these completed bundles by placing other lower cleats 23 against the upper cleats 25 of the bottom bundles already formed and the operation continued the same as in forming of the lower bundles, in which operation, however, one end of each piece of lumber is brought to bear against the gaging abutment 17b to longitudinally space the pieces of the upper bundles with relation to those of the lower bundles. The bundling trucks carry center stakes or standards 19' to keep bundles apart vertically in forming bundles, and these stakes and the side stakes 19 serve as gages to ensure the placing of the pieces so that the outer longitudinal edges of the outermost or side pieces in each horizontal row of parallel pieces will accurately register at the sides of the bundle. A gage may be used to keep similarly the bundles apart when being transported by crane. The completed bundles may then be removed by lifting them vertically off the hand truck after gate 17 is lowered and stakes 19 loosened. The cleats 23 resting in supports 22 provide a means for spacing the bundles from the platform 15 to permit of the insertion of the engaging members of a crane under and about the bundles to adapt the same to be simultaneously removed for transfer to a storage stack.

The particular manner in which the bundles may be formed, and the advantages arising therefrom, will be readily understood by reference to Figs. 1, 7, 8 and the following description. It will be noted that each truck 13 provides a bundle former which is open at one (its rear) end and closed at its opposite (or forward) end when the drop gate 17 is swung upward and latched in such position. In forming a bottom bundle between the center and left hand side of the bundle former, for example, the bottom slats 23 of the binders for the bundle, to which the binder straps are attached, are placed in the proper channeled holders 22, whereby the binders are accurately gaged as to position respecting their distances from each other and their distances from the ends of the bundle to be formed. The bundle former 13 having been arranged alongside the carrier vehicle 10 containing the lumber pieces which are to be formed into bundles, the lumber pieces directly, when and as removed from the vehicle 10, are placed in position on the bundle former. In so doing the first lumber piece of the horizontal bottom row is inserted longitudinally through the open rear end of the former so that its outer side edge bears against either the stakes 19 or the stakes 19', accordingly as the pieces are laid from left to right or right to left, and until the forward end of said lumber piece abuts against the bottom abutment surface 17' of the abutment member 17, whereby in the act of inserting the lumber piece, which rests upon the gaging holders 22, one end of the lumber piece, one side of the lumber piece and the bottom of the lumber piece are properly gaged, with reference to the positions which they are to occupy in the bundle and with regard to the spacing of the lumber piece above the gap 15, without particular attention or care on the part of the operator. After this first lumber piece of the bottom row is inserted the intermediate and side pieces composing the bottom row are fitted in position in parallel relation to each other and so that the forward ends of said pieces will engage the abutment surface 17' and the side piece will engage the stakes 19 or the stakes 19', as the case may be, according to whether the row is formed from left to right or right to left of the forming space. The lumber pieces comprising the other rows are then laid by the operators in like manner upon the preceding rows until the required number of rows of superposed lumber pieces have been built up to form the bottom bundle. The upper binder slats 25 are then applied across the upper row of lumber pieces and the ends of the binder slats drawn over upon and secured thereto, whereby a bound bundle is formed in which the slats at the ends and sides of the bundle are exactly gaged or disposed in registering alinement with each other and in which the top and bottom slats 23 and 25 of the bundle are accurately spaced and arranged to serve as abutment gages for the formation of a second or top bundle on the bottom bundle so formed. After the formation of the bottom bundle is completed, the binders for the top bundle are set in position with their bottom slats engaging the rear edges of the top slats of the binders of the lower bundle and resting on the top row of lumber pieces of the bottom bundle, whereby said binders of the top bundle are properly set in gaged position to space them the same distance apart as the binders of the bottom bundle. The top bundle is then formed by the insertion of lumber pieces in the same manner as above described with relation to the bottom bundle until the required number of rows of lumber pieces are built up to form a second bundle having the same number of pieces and of the same dimensions as those of the bottom bundle, the bottom slats of the binders of the top bundle supporting said bundle from the bottom bundle and spacing the bottom row of lumber pieces of the top bundle an accurate distance from the top row of lumber pieces of the bottom bundle. In the operation of assembling the lumber pieces forming the top bundle, the forward ends of these lumber pieces are brought to bear against the inner abutment surface 17a of the abutment 17, which lies in a vertical plane offset inwardly from the abutment surface 17', as a result of which the forward end of the top bundle formed is spaced longitudinally from or caused to terminate a gaged distance inwardly from the forward end of the bottom bundle, whereby the rear end of the top bundle is caused to project a similar distance rearwardly beyond the rear end of the bottom bundle, so that the ends of the superposed bundles will be offset to lie in different vertical planes or staggered with relation to each other. While a pair of superposed bundles are being formed in the manner described between the longitudinal center and left hand end of the former, two similar bundles may be in process of formation between the longitudinal center and right hand side of the former, so that four bundles comprising two piles, of a pair of superposed bundles to a pile, may be formed at the same time upon the bundle former. By this construction of the former and mode of forming the bundles, the lumber pieces may be directly delivered from the vehicle 10 in the dimensioned form in which they are supplied from a lumber mill and placed upon the forming truck so that in the operation of placing the lumber pieces they will at the same time be formed into bundles, with a material reduction in time and labor over all customary practices in bundling lumber for storage or for storage and dispensation. The lumber piles may then be delivered by movement of the truck to a point where they are to be transported by a crane to a storage space in the storage building, and then all four bundles may be engaged by the slings of the crane and lifted by the crane off the former and delivered by means of the crane to the proper storage point in the storage house. As, in the operation of forming the bundles, they are spaced by the gaging holders 22 from the forming bed 15, it will be understood that, by simply dropping down the gate 17, both ends of all the bundles on the former will be exposed so that the slings of the crane may be slipped under the ends of the bottom bundles and into the space between the same and the bed 15, thus facilitating the operation of engaging the bundles with the crane slings and reducing time and labor in that connection. As, also, in the forming operation, the piles of bundles are provided with spacing binders and so arranged that the bundles of each pile have their ends staggered, the piles of bundles transported by the crane may be laid directly upon other similar piled bundles and gaged as placed in position by the binders so that two stacks of parallel bundles, in which the bundles of each stack are longitudinally staggered with relation to each other, may be built up without the exercise of any particular care or adjustments on the part of the crane operator, thus providing for the storage of the bundles in stacks in a time and labor saving manner. As previously stated, as the ends of the bundles in the stacks are disposed in staggered relation, the operation of engaging the slings of the crane therewith in removing bundles from a stack is also facilitated and time and labor further saved in this operation.

It will be understood from the foregoing that the stock lumber suitably cut or in suitable sizes to be formed into bundles of the desired size is, upon its removal from the car 10, loaded upon the truck forms 13 and formed into bundles in the unloading operation, the bundle forming operations being completed by uniting the free ends of the binder strips, so that, with but a single handling of the material as unloaded from the supply car 10, it may be formed into bundles ready for conveyance to and storage in the warehouse room 7. Cranes or equivalent hoisting and conveying apparatus 26 are provided for transferring the bundles from the receiving room 5 to the storage room 7 and stacking them in the latter, and delivering the bundles from the stacks, as required, to the delivery room 6 for outgo shipment. A plurality of trucks 13 are employed in order that the operation of unloading the lumber from the supply car 10 and its formation into bundles may be carried out by successive operations of forming bundles on trucks 13, one after the other, without the necessity of delaying such operations while loaded trucks are waiting to be relieved of their bundles by the working cranes, when and in the event that the cranes are actively engaged at the time in stacking work in the room 7 or in the transportation of bundles to the stacks or from the stacks to the delivery room, thus avoiding the waste of time which would otherwise occur.

The room or storage space 7 is divided by longitudinal rows of columns or uprights 27 into a desired number of aisles or alleyways extending uninterruptedly from the floor level 12 to a point near the roof of the building or a desired level below the same. In the present instance the room 7 is shown as divided by the rows of columns 27 into five aisles or alleys 28, 29, 30, 31, and 32, inclusive, each designed to receive at least two closely arranged longitudinally extending and transversely alined rows of stacks or piles of bundles formed as previously described. These aisles may be of the same width, if stacks of bundles of the same length are to be stored therein, but are preferably of suitably different widths to receive stacks of lumber in bundles of different varieties and lengths according to the type or character of the lumber of which the bundles are composed. The bundles of the different stacks or piles, however, are so formed and arranged as to register in transverse rows, so that an equal number of piles or stacks may be placed in each longitudinal row, or the rows so disposed that the stack or pile positions may be properly numbered for each right and left hand pile or stack in each aisle, for convenience in placing the stacks or piles in position and in locating the same for piling and unpiling operations and for the purpose of storing and dispensing different kinds of lumber in a convenient and rapid manner. To this end, the pile or stack positions in each aisle are properly designated by indicators indicating the variety or character and dimensions of the materials comprising the bundles in the stacks disposed in the different stack spaces, as by numbers prominently placed upon the floor 12 or at other convenient points so as to be conveniently read from overhead. In the present instance each aisle 28 to 32, inclusive, is shown as provided with fifty-one stack spaces or stations, which are properly numbered from the delivery end toward the receiving end of the building, each stack space or stage having inner and outer right and left hand transversely alined stacks arranged therein, which are spaced from each other at their inner and proximate ends by a conveyor passage 33 and which are separated at their outer ends from the columns 27 by spaces 34. These spaces 33 and 34 provide longitudinal aislettes along the sides of the stacks or between the stack rows for passage of employees or attendants and for travel of cooperating portions of the cranes or conveyors whereby the bundles may be transported.

The columns 27 carry tracks 35 which support track rails 36, two such track rails 36 being provided in each stack aisle for engagement by the wheels or rollers of a traveling crane or conveyor 37 mounted for longitudinal travel therein, and which track rails also extend beyond the stack aisles over the receiving station 5 and delivery station 6 so that the crane may be employed to pick up the bundles formed on the hand trucks at the receiving station and convey them to the stacking points in the room 7 for building up and replenishing the piles of a single stack or two transversely alined stacks when required at one and the same time, and for transporting the bundles to be sold or shipped out from either or both stacks at one and the same time, if required, to the delivery or shipping station 6. The crane is provided with a depending carriage 38 to contain the operator and control devices and which travels in the passage 33 between the piles or stacks, so that the operator may be in a position to conveniently control the crane and to observe the stacks and read the indicating numbers of the stacks from his position in the crane carriage and govern the placing of the bundles upon one another or their removal from the piles or stacks. The carriage 38 carries a ladder 39 to enable the operator or others to conveniently ascend to or descend from the carriage, and in practice this ladder is preferably supported so that it may be moved downwardly for use when desired and drawn upwardly into the crane carriage when not in use. The crane bridge carries, on opposite sides of the carriage, a pair of hoisting members 40 for supporting hooks, grapples or similar bundle engaging members 41 which may consist, as shown in the present instance, of U-shaped cradles of angle iron pivotally mounted on the hoist 40 so as to be slipped under and about the ends of one or more bundles of either or both transversely alined stacks to support the same for transit, and to be withdrawn outwardly to release the bundles for deposit. The engaging members 41 of the cranes used in the different aisles may be of different sizes and suitably sized for engagement with one or more bundles of piles or stacks stored in the different aisles, according to the widths and heights of the bundle or bundles to be engaged. In addition to the end engaging members, one or more center or intermediate engaging members may also be employed when necessary on long length lumber to lend support and prevent sagging of the bundles. The center engaging members are not shown, as these may be of any ordinary or preferred type, and as the construction and use of such devices will be readily understood by those versed in the art without illustration or further description. It will be observed that the depending crane carriage 38 is of such narrow width that it may travel in the aisle between two lumber stacks without interference therewith, and that this carriage terminates at a sufficient level above the floor of the aisle to permit attendants to walk along the aisle between the stacks and beneath the crane while the latter is in operation, so that the floor of each aisle and the aisle itself is free of obstructions to the travel of workmen or others in the plant engaged in lumber inspecting and other operations even during the operation of a crane. When the crane is in active operation the ladder 39 is drawn upward to an out of the way position and is lowered only when the crane operator wishes to descend from the crane carrier to the floor level or to climb upward into the crane carrier from the floor level. This construction of the crane carriage permits of the arrangement of the slings 40 at opposite sides thereof so as to be disposed for operation above the respective stacks at opposite sides of the aisle and so as to be simultaneously or independently manipulated by the operator in the crane carriage to remove bundles from the stack or to pile bundles thereon at any level.

Upon the floor or other suitable portions of the building may be placed suitable signs or indicia specifying the sizes and kinds of lumber stored in the piles in the respective aisles, and it will be understood that, in practice, bundles of lumber of the same kinds and lengths, or different kinds and lengths up to a certain limit may be stored in each aisle. Thus, by reference to Fig. 1, it will be seen from the designations given that the division spaces of aisle 28 contain stacks or piles of bundles of eight feet, nine feet and ten feet, respectively, aisle 29 contains bundles of lumber of twelve foot length, aisle 30 contains bundles of lumber of fourteen foot length, aisle 31 contains bundles of lumber of sixteen foot length and that the division spaces of aisle 32 contains bundles of lumber of eighteen, twenty, twenty-two and twenty-four foot lengths arranged in appropriate piles.

The lumber contained in the bundles in the piles or stacks may be of diversified character and comprise the entire range of the different kinds of lumber commonly carried by a dealer for retail or semi-wholesale purposes, namely, framing in all of its various sizes and different lengths, siding, flooring, ceiling, bulkhead, etc., and there may be in each bundle a predetermined number of pieces of given length, making a desired total number of feet of the particular material in each bundle. Thus, for example, there may be thirty-six pieces of 2 x 4 material, each of a length of eight feet, in each bundle of a certain pile or stack and the same number of pieces but of different lengths of the same material in other piles or stacks, and there may be twenty-four pieces of 2 x 6 material, each of eight feet, in each bundle of a certain stack or stacks and the same number of pieces, but of different lengths, in bundles of other stacks, and this may apply to different kinds, lengths and qualities of lumber, put up in bundles of any desired number of pieces and footage to suit the usual trade demands. The piles or stacks of different kinds, lengths and grades of lumber are conveniently arranged in the numbered stack positions or stages in the different aisles, each stack position or stage bearing a designating number applying to two transversely alined piles or stacks, which may be differentiated by the use, in addition to the number, of the letter L to indicate left and the letter R to indicate right, as L18 and L19, whereby their positions may be simply and accurately indicated.

In the operation of the crane along the aisles for the purpose of depositing or removing bundles, the truck of the crane travels in the overhead space above the stacks in each aisle or passage, while the depending carriage of the crane travels in the space between the stacks in the aisle and the engaging members of the crane travel in the overhead space above the respective stacks in the aisle or passage 34, and one purpose of applying binders of the character described to the bundles is to enable the bundles to be accurately and quickly positioned on one another to form the piles or stacks, and in such manner that each bundle will be vertically spaced from the other, to permit of the ready and convenient insertion of the crane engaging members endwise beneath and in engagement with the desired bundle to be lifted alone or with another superposed upon it. Preferably, but not necessarily, the binders are also so positioned that the bundles when piled will have their ends horizontally or longitudinally spaced from one another, thus staggering the ends of the bundles with respect to each other, to further facilitate the engagement of the crane engaging members therewith. As before described, the binders are disposed a fixed distance apart with relation to each other and to the ends of the bundles, so that in placing one bundle upon another the lower cleats 23 of each upper bundle is arranged to abut laterally against the upper cleats 23 of the bundle immediately below it, with the result that the bundles will be vertically spaced by the cleats between their proximate faces, and the binders are also preferably so disposed as to cause the bundles to be longitudinally spaced by reason of the fact that the binders will be out of vertical alinement and one end of each bundle will project beyond or overlap the adjacent end of an adjacent bundle to a predetermined or gaged degree and the opposite end of the first-named bundle will lie within the vertical plane of the adjacent end of the other bundle. By this arrangement when the bundles are arranged in stack formation the superposed bundles will lie in zigzag order or arrangement throughout the pile or stack from bottom to top thereof, so that the ends of the bundles at each end of the pile or stack will alternately project or recede with relation to each other. With this arrangement the projecting ends of adjacent superposed bundles will form guides to adapt the crane engaging members 41 to be easily slipped in position between such bundles for the removal of the upper bundle and any disposed above it, by which means the operation of stacking and unstacking the bundles may be performed with great ease and facility and in a time and labor saving manner. Each stack or pile may consist of single bundle units arranged in superposed order, or of two or more sets of superposed units, as desired and as practical operations may require, Fig. 6 showing an arrangement in which two vertical rows of bundles in each pile or stack are disclosed. Thus the bundles as formed on the forming trucks may be picked up by a conveyor and conveyed to the storage room and deposited in the proper stack space or upon the proper stack pile, and in a similar manner bundles may be transported from any stack or pile in the storage room to the delivery platform at the delivery station 6 for transfer to a delivery truck or vehicle in the shipment of the lumber to a customer, such operations enabling unitary bundles containing fixed amounts of lumber of any kind to be handled a minimum number of times and with the greatest ease and facility to reduce handling expenses, while enabling material of a predetermined or stock size to be supplied without waste or liability of damage in conducting a sales transaction. While this zigzag method of piling is preferred, any other method of piling allowing ready removal of bundles may be employed so long as it accords and coacts with a preliminary step of bundling the material into unit packages to provide a system which facilitates handling, storage and transportation of the bundles..

In the lumber industry the piece has always been used heretofore as the unit of handling and a thousand feet as the basis of figuring and merchandising. These ways of handling and merchandising have been departed from only to a limited extent, as, for example, in the putting up, for convenience of handling, of shingles and other like small lumber items in bundle form of a certain number to a bundle, the bundles of which are stacked or piled more or less haphazardly in bins in a lumber yard or warehouse, this practice applying only to such items as are commonly made in fixed sizes, but not to different kinds and dimensions of lumber commonly put up in different lengths and piled in piece form in stacks or bins in a lumber yard and which must be cut to ordered lengths to suit different sales orders. My invention differs from these previous practices in putting up dimensioned stock in standard unit packages for the purpose of overcoming the objections to such previous practices and solving the problem of obviating the handling, piling and cutting of the pieces a large number of times, and the waste of time and material thus occurring, while at the same time furnishing pre-dimensioned stock of any and all kinds of lumber in standard unit packages of the footage amounts commonly called for by the trade and the public. Many attempts have been made to reduce the handling of such dimensioned stock and to devise ways of marketing the same in standard unit packages, but with disappointing results. My invention solves the problem and effectually overcomes the previous difficulties, without the necessity of varying present methods of milling the stock in conventional thicknesses, lengths and widths, for the reason that it provides a method whereby any dimensioned stock may be easily and quickly, and with a minimum amount of labor, put up as received by a storage warehouse from a mill, and during the process of loading from a transport vehicle, into unit package form and in such manner as to produce standard unit packages which, as formed, may be engaged and transported as such for storage into stacks which may be arranged with a great saving of space in the storage warehouse. My invention further provides a method whereby such standard units are adapted to be stacked in a prescribed manner and in such manner that the application to and removal of the packages from the stacks for stack building and unit dispensing purposes may be affected in a ready, quick and economical way, to further reduce the number of pilings and handlings, so that finished lumber of various varieties and sizes, and in amounts commonly called for, may be supplied to purchasers at a material saving as compared with the storage and handling methods commonly employed. My invention also provides a method of stacking the standard unit packages in a warehouse for coaction with an overhead handling crane whereby the amount of floor space ordinarily required for the occupancy and travel of an ordinary crane or other handling devices may be saved and such handling devices removed entirely from the storage space, leaving the latter available for the storage of a maximum amount of standard lumber unit packages. My method of bundling or packaging and stacking further allows the crane operator to readily identify, from an overhead position above the stacks, the particular stacks containing the standard units of the variety or varieties and dimensions of lumber called for by sales orders, and to remove simultaneously from one or more adjacent stacks a selected number of bundle units for transfer to the sales room or sales point in the warehouse. By thus coordinating the bundling or packaging, storing and handling or conveying steps so that they coact to produce a unitary result in the way of reducing the number of handling operations required in packaging, storing and conveying the goods, and the amount of space required for the purpose, a commercially practical way of furnishing in standard unit packages lumber material of various kinds and of standard thicknesses, lengths and widths is produced, and one which will not only stimulate the sale of lumber, because of the convenient and low cost with which it can be supplied, but which will protect the product from damage and the public from the purchase of inferior material. This method, unlike any other, lends itself admirably to the packaging by large lumber concerns of all kinds of lumber in standard unit packages in such manner as to permit such concerns to warrant the amount and quality of their product, similar to the manner in which other packaged goods are sold, and which has not been possible heretofore in the production and sale of lumber. I am aware of the fact that it has heretofore been a practice to temporarily bundle pieces of lumber together in a desired quantity for convenience in performing a certain specific step of treatment in the manufacture of finished lumber, as, for example, for seasoning, drying, and like operations, with the idea simply of holding the material together for a certain time while the work is being done. In such steps, however, as heretofore employed there has never been any intended uniformity of bundling, spacing or binding either for the purpose of selling different varieties of dimensioned lumber in standard unit packages, or of effecting any particular handling coaction between bundles of a particular quantity, or between one bundle and another, or between binding means so coacting in bundles that the bundles may be stacked and transported in a particular way to produce a system of handling between operations of unloading lumber pieces from a mill and a sales transaction, whereby the successful and economical production and sale of lumber in standard unit packages may be practically carried out.

The delivery room or station 6 is provided with a floor 42 below the level of the floors 11 and 12 and forming a roadway for delivery trucks or vehicles 43 to which the bundles of lumber for delivery may be directly transferred from the storage room 7 by the proper crane. The room 6 is also provided with a platform 44 arranged at the same level as the platform 11 and floor 12 on which a shipping clerk may stand for convenience in conducting or supervising load transfers and other transactions. Preferably there is provided upon the wall 4 above the platform 44 a shipping chart or directory board 45 and a shipping card-holding frame or rack 46 of the type shown in Figs. 7 and 8, respectively. The chart or directory 45 is provided with a central vertical space 47 above which is placed the word "Trucks", and on opposite sides of the central vertical space are other spaces 48 and 49 separated, like the space 47, by horizontal transverse lines into placard receiving sub-divisions, the sub-divisions of the left hand spaces being headed by the designating caption "Left" and the sub-divisions of the right hand spaces being designated by the caption "Right". In the sub-divisions of the vertical space are adapted to be placed and hung or otherwise suitably supported sign plates 50 bearing numbers or other indicia representing the different delivery trucks 43 of the establishment or a sign 51 bearing a star representing an outside truck or one owned by a customer or delivery concern calling for an order, while in the sub-divisions of the spaces 48 and 49 are intended to be placed and hung or otherwise supported sign plates 52 bearing numbers designating the pile rows in the storage aisles. Quantity tags 53 are hung over the upper part of designating tags 52 so as to show the number of bundles of a particular kind desired. The purpose of this shipping or directory chart is to enable the delivery clerk to designate to the drivers of delivery trucks and to the crane operators orders of materials to be supplied from certain stacks to certain delivery trucks, so that, even in the temporary absence of the delivery clerk or while he is busily engaged in some part of his work, the craneman and deliveryman may carry on their work without the necessity of being given oral instructions and in such manner as to prevent waste of time in delivering operations. The rack or holder 46 is designed to hold a supply of the numbered plates 50, 51, 52 and 53 and is provided with properly designated compartments for the purpose, the pockets of the stack plates corresponding in number to the number of stack piles in the aisles, as will be evident by reference to the plate holding pockets of the rack designated by the word "Stocks".

There are also preferably provided at suitable points within the delivery or shipping room stock sheets or boards designating the kinds of material and the location thereof in the storage room 7. One of these stock sheets or delivery sheets designated 55 as shown in Fig. 11, is applied to the stock contained in the bundles of the stacks of one of the aisles or alleys, and it will be understood that in practice a sheet or directory of this kind will be provided for indicating the character and location of the material in the bundles of the piles or stacks in each of the aisles or alleys. This sheet or directory contains reference to various sizes or kinds of material, and the grade thereof, and the number of the stack or pile in which it is kept, preceded by the letter R or letter L, as the case may be, to indicate that the material is in the right hand or left hand stacks of stack stage No. 1. By reference to this the location of any kind of lumber kept for sale in the establishment may be readily, conveniently and quickly determined, and the craneman operating in any aisle or alleyway may, by the manner in which the piles in the aisles are designated, quickly stop his crane and bring it into position to remove bundles from the designated pile or piles for transfer to the delivery trucks, thus saving time and work in these operations. For the convenience of the employees and customers there may also be placed at a suitable point in the delivery room a price sheet or board 54 of the type shown in Fig. 12, which sheet or board is provided with appropriately designated spaces giving the number of pieces of material in 2 x 4 or other kind of stock, the length of the bundle, the total number of feet therein, the price per thousand, and the price per bundle, and this sheet, only a portion of which as actually used in practice is shown, may and will preferably be provided with divisions giving information respecting the kind and number of pieces of material of different classes in all the bundles throughout the piles or stacks and other information of the kind noted with the object of reducing time and labor and facilitating the conduct of the business. The price tables given are designated for use, in accordance with this method of handling lumber, in the selling of bundles of lumber of a certain number of pieces for a specific amount, the feet content and price per thousand being indicated only for comparative purposes with outside prices. In practice, each bundle of lumber of similar size may contain the same number of pieces irrespective of its length, to wit, all 2 x 4 can pack thirty-six pieces to the bundle and the feet content would be determined by the length of the lumber, while 2 x 6 would have only twenty-four pieces to the bundle, 2 x 8 eighteen pieces, and so on as indicated, the price tables allowing comparisons to be made with prices for lumber charged in lumber transactions conducted in the usual way.

From the foregoing description taken in connection with the drawings, the construction and mode of operation of the mechanical means, and the steps of the method, for carrying my invention into practice will be readily understood, and it will be seen that the invention provides a warehouse construction and method of bundling lumber and stacking the bundled lumber therein whereby larger quantities of lumber may be stored within a warehouse of given size by the method of bundling and stacking and the elimination of the driveways usually employed for convenience purposes. Also it will be seen that my invention provides a method and means whereby the lumber as delivered from a mill or source of supply may be bundled in proper shape for either retail or semi-wholesale sales transactions, and whereby such lumber may not only be rapidly formed into bundles but conveyed to and stacked within the warehouse in a ready and convenient manner and in such a manner as to enable bundles of different kinds of lumber to be quickly located and removed from the stacks and transported to a delivery room or stage for delivery shipment. This method of bundling and storing lumber allows the lumber to be kept clean and dry and straighter lumber, that is, lumber free from warping or crooking and twisting defects, to be furnished at lower than usual prices. This also follows from the fact that the lumber may be stored and handled with less waste and in less time and with less labor as many usual handling operations are eliminated and the time periods of other necessary operations reduced. Other important advantages are as follows, first, that the bundled lumber is bundled, stored and merchandised in such a way that its position as to direction is never changed from the time it reaches the bundling room until it reaches the warehouse on delivery trucks; second, that the lumber is stored in aisles in the warehouse with all piles arranged in such order that bundles from any of the piles may be conveniently picked up by transfer cranes, the arrangement of the piles being such as to facilitate the engagement of the engaging members of the cranes with the bundles in stacking and delivery operations; third, the warehouse arrangement allows the lumber to be stacked as nearly as possible with all of one length of lumber in a single aisle or alley, and the alleys to be properly numbered so that consecutive numbers will represent piles of lumber at the right and left of a passageway therebetween; fourth, an arrangement whereby a shipping chart may be placed at the head of each aisle or alley on which the shipping clerk may designate to the crane operators by numbered cards how many bundles of lumber and from what piles of lumber he desires load may be obtained, thus reducing time and labor in collecting lumber for delivery; and, fifth, my improved method and apparatus permits of the warehousing and merchandising of bundled lumber in quantities that can not be conveniently handled by hand and of a character allowing immediate delivery of specified quantities of lumber in bundled form, so as to reduce time, labor and expense to both the dealer and the customer.

Also it will be seen from the foregoing description that my invention provides a method of bundling and dispensing lumber whereby lumber may be dispensed in the form of bundles consisting of a certain number of pieces of a given length and width, such bundles constituting basic units of sales instead of the basis of so much per thousand feet at which lumber is commonly sold, whereby the advantages hereinbefore set forth may be secured and the disadvantages to a customer of dealing under the so much per thousand foot method overcome and avoided in a simple and effective manner.

Figs. 5 and 6 show the use of anti-tipping stays 23' comprising loose pieces of lumber, as 2" x 2" pieces each 4' long, placed so as to extend at intervals between bundles of two vertical piles of bundles forming a stack, and which may be arranged between every fourth or fifth bundle of each pile, to tie the piles of a tall stack together so as to mutually support each other and thus prevent the stack from toppling over. It will be understood that a stack twenty feet high or higher and formed of a single pile of two feet wide bundles would be unstable and would fall over if not supported, and that the same would be true of a stack composed of two or more such unsupported piles disposed side by side. By using the stays 23' as described, however, this difficulty is overcome in a very simple manner and without using supports liable to interfere with the convenient and free use of the crane, and by disposing the stays as set forth a high stack formed of a minimum of two narrow piles may be supported through the coupling of the piles by the stays as to prevent the stack from falling over.

While the specific steps of the method and construction of parts of the apparatus herein disclosed are preferred for the carrying of the invention into practical effect, it is to be understood, of course, that the invention is not limited to the particular steps and structural features shown and described for purposes of exemplification, but that suitable variations in the steps of the method and changes in the form, construction and arrangement of parts of the apparatus may be made, within the scope of the appended claims, without departing from the spirit or sacrificing any of the advantages of the invention.

What I claim is:—

1. The method of bundling and stacking lumber, which consists in laying a predetermined number of pieces of lumber in superimposed rows with the ends of the pieces at the ends of the rows in alinement, uniting the rows of pieces into a bundle by means of a set of binder bands formed to provide transverse gaging elements spaced a predetermined distance from each other and from the ends of the bundle, disposing upon the bundle so formed a second set of binder bands with their bottom gaging abutments in lateral engagement with the top gaging abutments of the binders of the bundle so formed, laying a predetermined number of pieces to form a second bundle superimposed upon the first and applying thereto the second-named binder bands, whereby the completed bundles will be vertically spaced by the binder bands and also longitudinally spaced by said bands so that their ends will lie in different vertical planes, and then piling the bundles so formed in the same relation with other bundles longitudinally in parallel horizontal planes so as to vertically space the bundles and dispose the ends of the bundles in staggered order at each end of the stack.

2. The method of bundling and stacking lumber, which consists in forming bundles of lumber with transverse top and bottom gaging and spacing abutments arranged a predetermined distance from each other and from the ends of the bundle, and piling the bundles longitudinally in parallel longitudinal planes upon one another in stacks on opposite sides of a separating aisle with the ends of the bundles at one end of one stack facing the ends of the bundle at one end of the other stack, whereby the bundles of each stack will be vertically and longitudinally spaced as piled by the spacing and gaging abutments of the binders so as to dispose the ends of the bundles in staggered order at each end of each stack and so as to adapt the ends of bundles of the respective stacks to be readily engaged by bundle engaging devices arranged at opposite sides of the carriage of a transfer crane traveling in the aisle between the stacks.

3. The method of bundling lumber which consists in successively forming a pair of superposed bundles of pieces of lumber united by binder bands arranged on each bundle in spaced relation to each other and to the ends of the bundle and with the binders of the bundles relatively arranged to form transverse spacing and abutment gages whereby in the formation of the superposed bundles the bundles will be vertically spaced and the bundle ends longitudinally spaced to dispose the ends of the bundles in staggered order.

4. The method of forming and stacking bundles of lumber, which consists in first forming a bottom bundle by laying pieces of lumber in a specified relation to a set of binder bands having top and bottom abutment members, and so that the ends of the pieces aline with each other, until a required number of pieces are laid, then binding the pieces together by the binder bands at points spaced a predetermined distance from each other and from the ends of the bundle, then placing a second set of binder bands upon the bottom bundle so formed so that the bottom abutment members of said bands lie in transverse abutting engagement with the top abutment members of the bands of the bottom bundle, then laying pieces of lumber of a required number to form a top bundle upon the bottom bundle in specified relation to the second set of binder bands so that their ends register with each other but lie in vertical planes offset from the ends of the bottom bundle and in such relation that when a pair of completed superposed bundles so formed are piled with other bundles in a stack the ends of the bundles will be staggered with relation to each other at each end of the stack, and then binding the pieces of the top bundle together by means of the second set of binders.

ARTHUR B. CHAMBERS.